W. R. HARTSOOK.
SPRING MOTOR.
APPLICATION FILED OCT. 18, 1916.
1,248,489.
Patented Dec. 4, 1917.
4 SHEETS—SHEET 1.
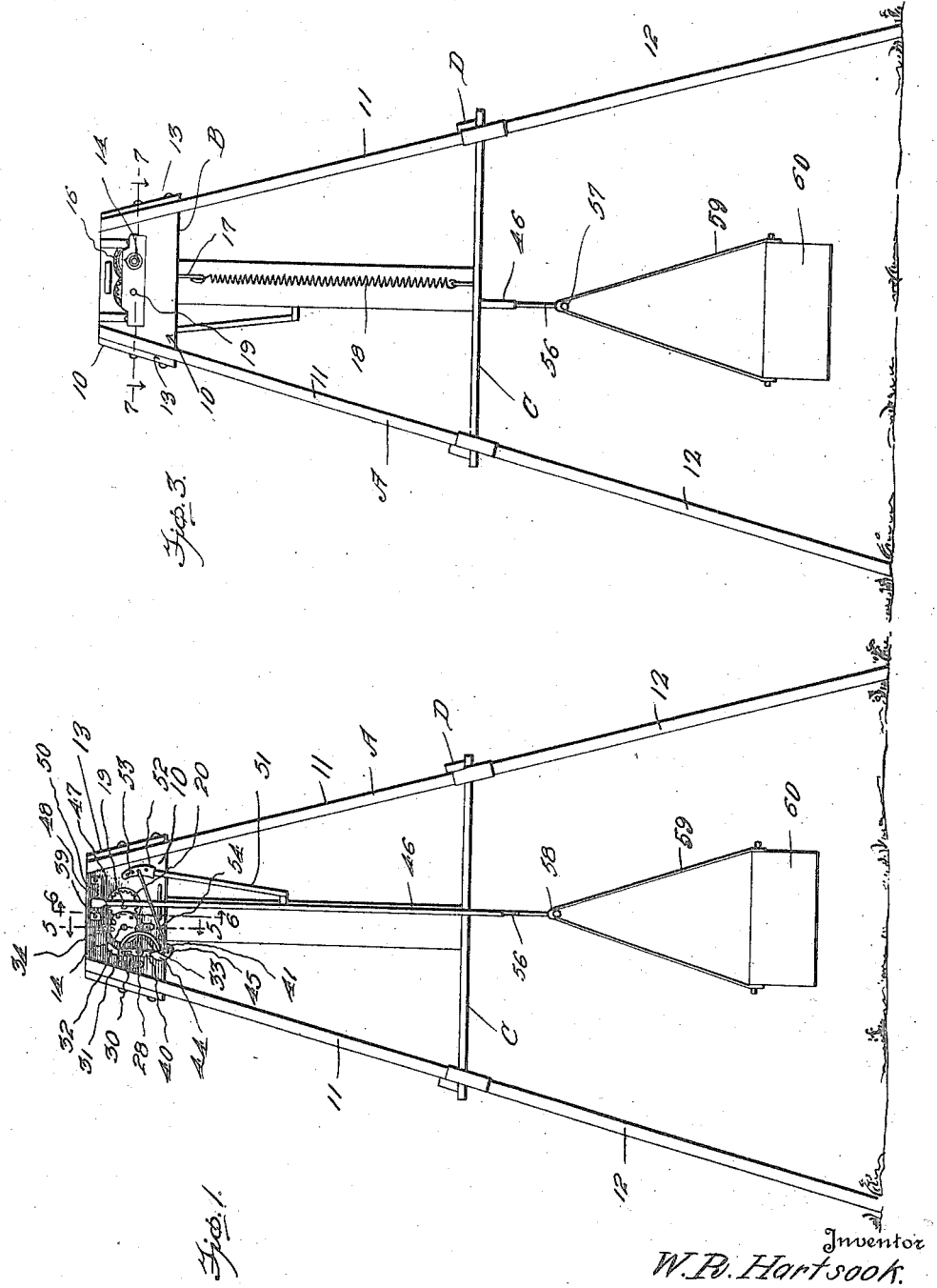

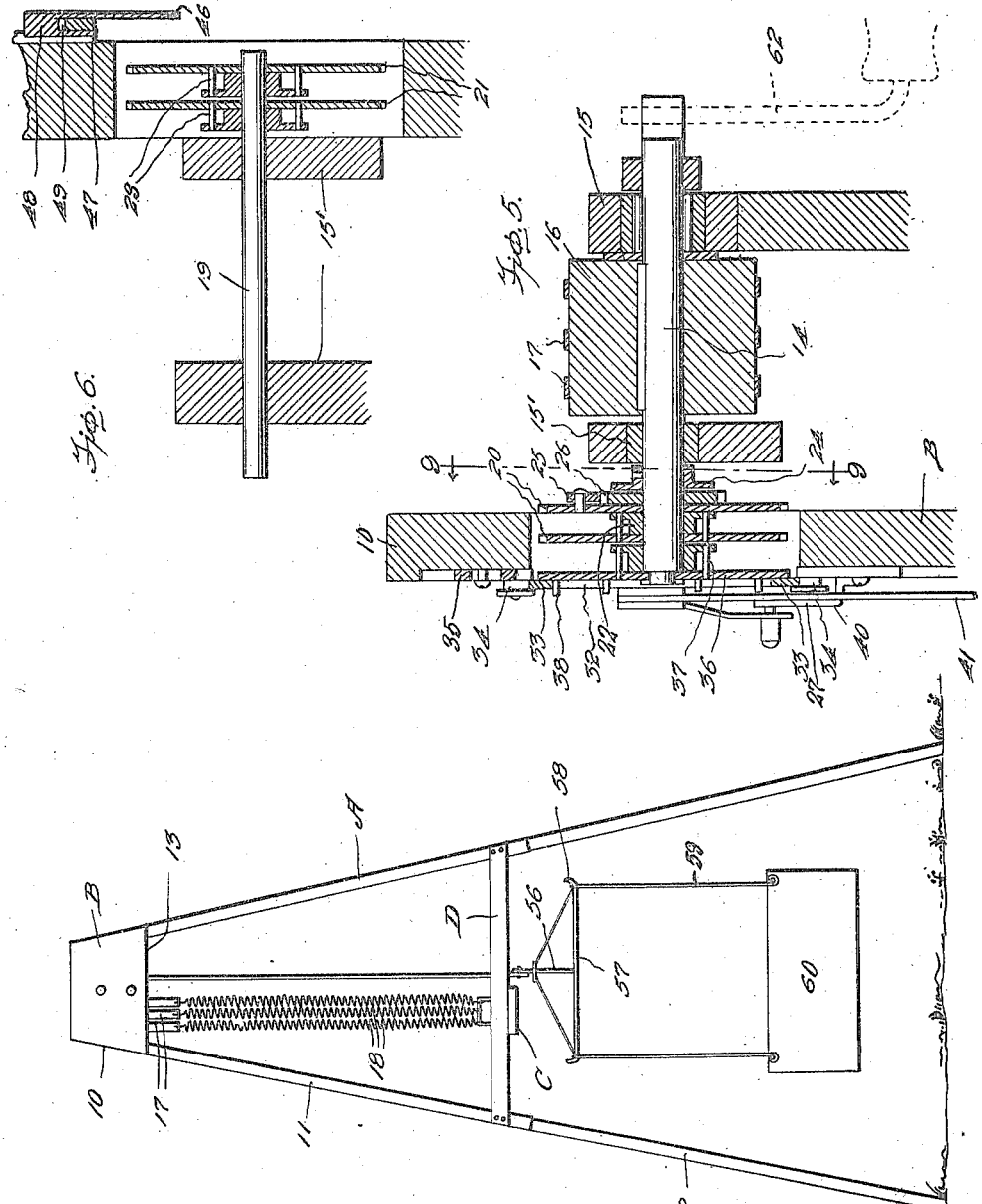

W. R. HARTSOOK.
SPRING MOTOR.
APPLICATION FILED OCT. 18, 1916.

1,248,489.

Patented Dec. 4, 1917.
4 SHEETS—SHEET 3.

Inventor
W. R. Hartsook
By John Louis Waters
Attorney

W. R. HARTSOOK.
SPRING MOTOR.
APPLICATION FILED OCT. 18, 1916.

1,248,489.

Patented Dec. 4, 1917.
4 SHEETS—SHEET 4.

Inventor
W. R. Hartsook.

By Talbert Parker
Attorneys

UNITED STATES PATENT OFFICE.

WILLIAM R. HARTSOOK, OF PORTLAND, OREGON.

SPRING-MOTOR.

1,248,489.  Specification of Letters Patent.  Patented Dec. 4, 1917.

Application filed October 18, 1916. Serial No. 126,389.

*To all whom it may concern:*

Be it known that I, WILLIAM R. HARTSOOK, a citizen of the United States, residing at Portland, in the county of Multnomah and State of Oregon, have invented certain useful Improvements in Spring-Motors, of which the following is a specification, reference being had therein to the accompanying drawing.

The invention relates to a motor structure, and more particularly to the class of spring motors adaptable for operating baby swings.

The primary object of the invention is the provision of a motor for a swing wherein the carriage of the latter for an infant is oscillated in reverse directions under the action of the motor which is of novel construction and is operative when the carriage is subjected to a load.

Another object of the invention is the provision of a motor of this character wherein the pendulum rod for suspending the carriage of the swing is reciprocated under the action of said motor which can be manually wound for the storing of energy therein and becomes active on subjecting the carriage to a load so that said carriage will be set in motion for a predetermined period of time, thereby eliminating the necessity of manually swinging the carriage.

A further object of the invention is the provision of a motor of this character wherein the construction thereof renders the same automatic in action for positively oscillating the carriage of the swing to set the same in motion for a predetermined period of time.

A still further object of the invention is the provision of a motor of this character wherein the pendulum rod is readily adjustable to bring the same to a true perpendicular position for the successful automatic operation of the motor when said carriage is subjected to a load without regard to the uneven position of the supporting frame.

A still further object of the invention is the provision of a motor of this character which is simple in construction, thoroughly reliable and efficient in its operation, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the drawings:

Figure 1 is a side elevation of a baby swing showing the motor constructed in accordance with the invention applied thereto;

Fig. 2 is an end elevation thereof;

Fig. 3 is a view similar to Fig. 1, looking toward the opposite side;

Fig. 5 is a fragmentary vertical transverse sectional view on the line 5—5 of Fig. 1, looking in the direction of the arrow;

Fig. 6 is a fragmentary sectional view on the line 6—6 of Fig. 1, looking in the direction of the arrow;

Similar reference characters indicate corresponding parts in the several views of the drawings.

Figure 7:
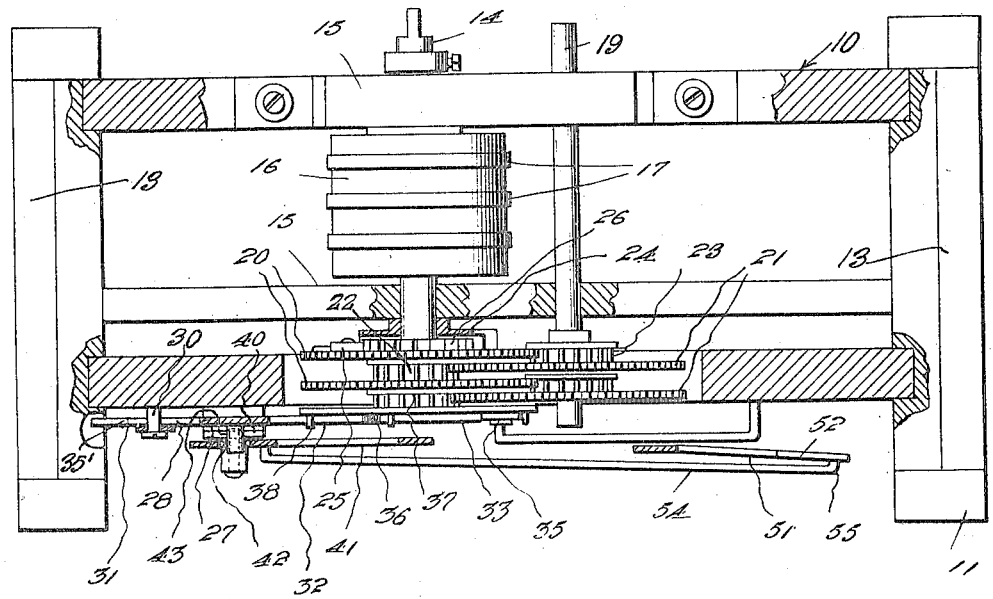
Fig. 7 is a fragmentary sectional view taken approximately on the line 7—7 of Fig. 3, looking in the direction of the arrows.
Figure 4:
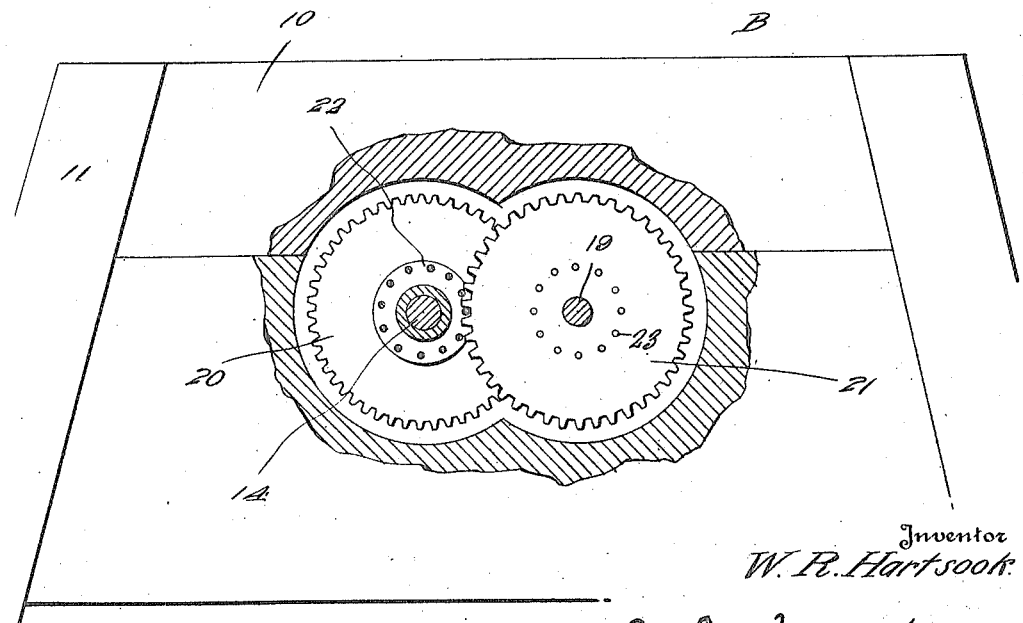
Fig. 4 is an enlarged fragmentary side elevation showing the motor partly in section.
Figure 8:
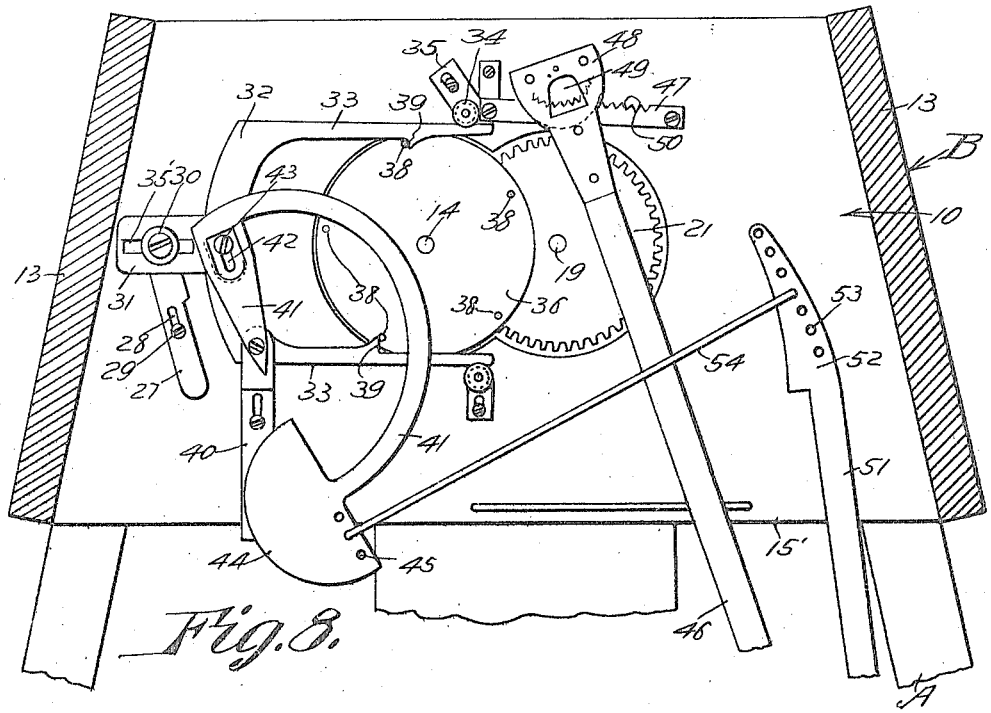
Fig. 8 is a fragmentary enlarged vertical longitudinal sectional view showing in detail certain parts of the motor in shifted position.
Figure 9:
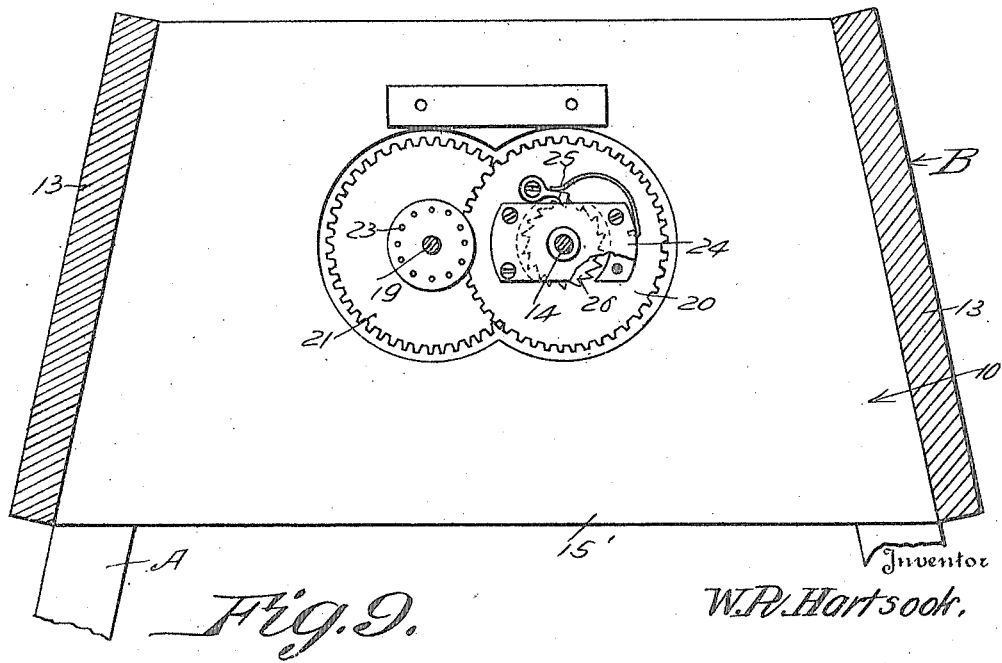
Fig. 9 is a sectional view on the line 9—9 of Fig. 5, looking in the direction of the arrows.

Referring to the drawings in detail, A designates generally the upwardly convergent spaced legs or props; B the head; C the center brace and D the end cross braces of a supporting frame for the swing, the center brace C being secured to the cross braces D intermediate their ends to materially strengthen or reinforce the legs or props A of the frame, while the head B is in the form of a rectangular shaped boxing 10 for the motor mechanism, to be hereinafter fully described.

The legs or props A of the supporting frame are preferably formed in upper and lower sections 11 and 12, respectively, which are detachably united to each other in any desirable manner so as to permit the separation of the lower sections 12 from said upper sections when the supporting frame is to be moved from one point to another or stored in the least possible space when not in use, the upper sections 11 being fixed to end plates 13 bolted or otherwise secured to the ends of the boxing 10 constituting the head B of the supporting frame.

Mounted in the boxing 10 forming the head B of the supporting frame is a spring operated motor which comprises a main winding shaft 14 which is journaled transversely of the boxing 10 in suitable cross pieces 15 and 15' constituting a part of said boxing, and these cross pieces have mounted therein suitable metal bearings surrounding said shaft, and fixed to this shaft 14 between said cross pieces is a drum or windlass 16 to which is secured a series of winding and unwinding straps 17 preferably of metal, which are connected to coiled retractile springs 18 which are also connected in any suitable manner to the center brace C of the supporting frame. On the rotation of the main shaft 14 in one direction the straps 17 are wound upon the windlass 16 against the resistance of the springs 18 which are adapted to expand on the winding of said straps upon the drum, thereby tensioning said springs for the rotation of the shaft in the reverse direction.

At one side of and parallel with the main shaft 14 and suitably journaled in the crosspieces 15 and 15' is a counter or driven shaft 19, while loose on the main shaft 14 is a pair of gears 20, and likewise loose on the shaft 19 is a pair of gears 21, one of the gears 20 being formed with a pinion 22 with which meshes one of the gears 21, and formed on both of said gears 21 are pinions 23 with which mesh both of the gears 20. On the other gear 20 is fixed a bridge plate 24 which overlies a ratchet wheel 26 fixed to the main shaft 14, while pivoted to this gear 20 is a spring-held ratchet dog 25 adapted to engage the ratchet wheel 26 to lock the said gear 20 thereon when the shaft 14 is rotated in one direction, while on rotating the shaft 14 in the reverse direction the gear 20 will be free for non-rotation therewith in said direction. Thus it will be seen that on rotating the shaft 14 in the reverse direction the straps 17 will be wound upon the drum 16 to tension the springs 18, which latter serve to rotate the gears 20 and 21 for a purpose presently described.

Adjustably fixed upon the boxing 10 exteriorly thereof on one side wall of the same is a guide hanger 27, the same being formed with an enlongated slot 28 through which is passed a set screw 29, the latter mounted in the side wall of the boxing and adjustably fastens the hanger 27 in place. On the hanger 27 is a guide lug 30 upon which travels the arm 31 of a mangle rack 32 which is in the form of a fork, the pallets or limbs 33 of which travel upon guide rollers 34 journaled on adjustable guides 35 which are mounted upon the boxing, and in this manner the mangle rack is accurately guided in its reciprocatory movement, the arm 31 being formed with an elongated slot 35' for receiving the guide lug 30 of the hanger 27.

Loosely supported or journaled upon the main shaft 14 is a rack escapement gear or disk 36 which is formed with a pinion 37 meshing with one of the gears 21 loose upon the counter or driven shaft 19, and this gear or disk 36 has mounted in its outer face, near the periphery thereof, at intervals, rack pins 38 which alternately engage with teeth or shoulders 39 formed on the pallets or limbs 33 of the fork constituting the mangle rack 32 so that on rotation of the gear or disk 36 in one direction said mangle rack will be reciprocatingly moved for a purpose presently described.

Below the mangle rack 32 and adjustably mounted upon the boxing 10 is a bracket 40 to which is pivoted an intermittently reversely rotatable operating arm 41 formed with a slot 42 in which is engaged a connecting pin 43 carried by the arm 31 of the mangle rack 32 so that on the reciprocation of the latter reversely rotatable movement will be intermittently imparted to the operating arm 41, the free end of said arm 41 being formed with a segment terminal 44 provided with a series of holes 45 for the adjustable connection thereof with a pendulum rod 46 mounted for oscillatory movement for a purpose presently described.

Upon the boxing 10 above the mangle rack 32 is mounted a hanger rack 47 which is spaced from the face of the boxing and adjustably supports for swinging movement the pendulum rod 46 which is formed at its upper end with a fulcrum 48 provided with a semi-circular toothed edge 49 meshing with the teeth 50 on the hanger rack 47, and in this manner the pendulum rod 46 is swingingly and adjustably supported so that the same can be moved to true perpendicular position irrespective of the disposition of the supporting frame for the swing, thereby assuring the proper oscillation of the pendulum rod 46 by the motor when active.

Carried by the pendulum rod 46 is an extension arm 51 formed with a curvilinear terminal 52 having a series of holes 53 spaced from each other and in any one of which is adapted to be adjustably engaged a connecting link or rod 54 which is also adapted for adjustable engagement in any one of the series of holes 45 in the segment terminal 44 of the intermittently reversely rotatable arm 41, the connecting rod or link 54 being formed with suitable attaching ends for the detachable engagement thereof with the holes in the segment and curvilinear terminals 45 and 52, respectively.

Suitably connected to the lower end of the pendulum rod 46 is the stem 56 of a hanger 57, the same being formed with hook ends 58 with which detachably engage stirrups 59 supporting a carriage 60 which is preferably in the form of a box or basket and in which is placed an infant in the use of the swing.

The main shaft 14 has detachably connected therewith a hand crank 62 which is manually turned for the winding of the strap 17 upon the windlass or drum 16 in the tensioning of the springs 18 for the storing of energy in the motor mechanism to effect the automatic operation thereof when the carriage 60 is occupied, so that the latter will be moved back and forth on the swinging of the pendulum arm.

On occupancy of the carriage 60 by an infant and moving the same to either side of the normal perpendicular position of the pendulum rod 46 the motor will be set in motion for the automatic swinging of the carriage 60 for a predetermined length of time, that is to say, until the tension of the springs 18, which have been expanded on the winding of the strap 17 upon the drum 16, is spent.

In event that the supporting frame A has been positioned upon an incline the pendulum rod can be adjusted on the hanger rack 47 to assume perpendicular position, and on this adjustment the motor mechanism will be equally effective for the working of the swing.

From the foregoing description, taken in connection with the accompanying drawings, the construction and operation of the herein described swing will be readily apparent and, therefore, a more extended explanation has been omitted.

Having thus described my invention, I claim:

1. In a motor of the character described, a series of transmission gears, an escapement wheel operated by the said gears, a mangle rack reciprocated by said escapement wheel, an intermittently reversely rocking element moved by said mangle rack, a pendulum rod suspended at one side of the mangle rack, an extension arm on said rod, a connection between the extension arm and said rocking element for oscillating the pendulum rod, and means for guiding the mangle rack in its movement.

2. In a motor of the character described, a series of transmission gears, an escapement wheel operated by the said gears, a mangle rack reciprocated by said escapement wheel, an intermittently reversely rocking element moved by said mangle rack, a pendulum rod suspended at one side of the mangle rack, an extension arm on said rod, a connection between the extension arm and said rocking element for oscillating the pendulum rod, means for guiding the mangle rack in its movement, and means for adjustably supporting the pendulum rod.

3. In a motor of the character described, a series of transmission gears, an escapement wheel operated by the said gears, a mangle rack reciprocated by said escapement wheel, an intermittently reversely rocking element moved by said mangle rack, a pendulum rod suspended at one side of the mangle rack, an extension arm on said rod, a connection between the extension arm and said rocking element for oscillating the pendulum rod, means for guiding the mangle rack in its movement, means for adjustably supporting the pendulum rod, and spring-actuated means for imparting movement to the transmission gears.

In testimony whereof I affix my signature.

WILLIAM R. HARTSOOK.

Copies of this patent may be obtained for five cents each, by addressing the "Commissioner of Patents, Washington, D. C."